United States Patent [19]

Lewis et al.

[11] Patent Number: 4,887,639

[45] Date of Patent: Dec. 19, 1989

[54] NON-DEGRADING PRESSURE REGULATOR

[75] Inventors: Richard D. Lewis, Bloomington; James P. Korzenowski, Minneapolis; Larry J. DeHemmer, Plymouth, all of Minn.

[73] Assignee: Graco Inc., Minneapolis, Minn.

[21] Appl. No.: 221,024

[22] Filed: Jul. 18, 1988

[51] Int. Cl.[4] ............................................. G05D 16/08
[52] U.S. Cl. ................................. 137/505.41; 251/120
[58] Field of Search ...................... 137/505.35, 505.41, 137/833; 251/356, 120, 121

[56] References Cited

U.S. PATENT DOCUMENTS

| | | | |
|---|---|---|---|
| 389,633 | 9/1888 | Bennett | 137/505.41 |
| 1,544,195 | 6/1925 | Stewart et al. | |
| 2,088,685 | 8/1937 | Birch | 137/505.41 X |
| 2,651,147 | 9/1953 | Eichelman | |
| 3,071,962 | 1/1963 | Perkins, Jr. | |
| 3,399,860 | 9/1968 | Billeter et al. | 251/121 X |
| 3,550,623 | 12/1970 | Katchka | 137/613 |
| 3,621,593 | 11/1971 | Hickey | |
| 4,003,405 | 1/1977 | Hayes et al. | 137/813 X |
| 4,053,354 | 10/1977 | Kitsnik | |
| 4,458,713 | 7/1984 | Wernberg | 137/117 |
| 4,467,828 | 8/1984 | Gneiding | 137/484.4 |

FOREIGN PATENT DOCUMENTS 1204777 1/1960 France .......................... 137/505.41

Primary Examiner—Stephen M. Hepperle
Attorney, Agent, or Firm—Douglas B. Farrow

[57] ABSTRACT

The pressure regulator is designed for use with materials which are particularly subject to degradation such as metallic paints. The construction of the device allows for maintenance of laminar flow throughout the device. A circular disk is located a variable distance from the upper side of the pressure reducing chamber and leads to annular spaces around the stem of the disk, the clearance is being such as to maintain laminar flow.

5 Claims, 1 Drawing Sheet

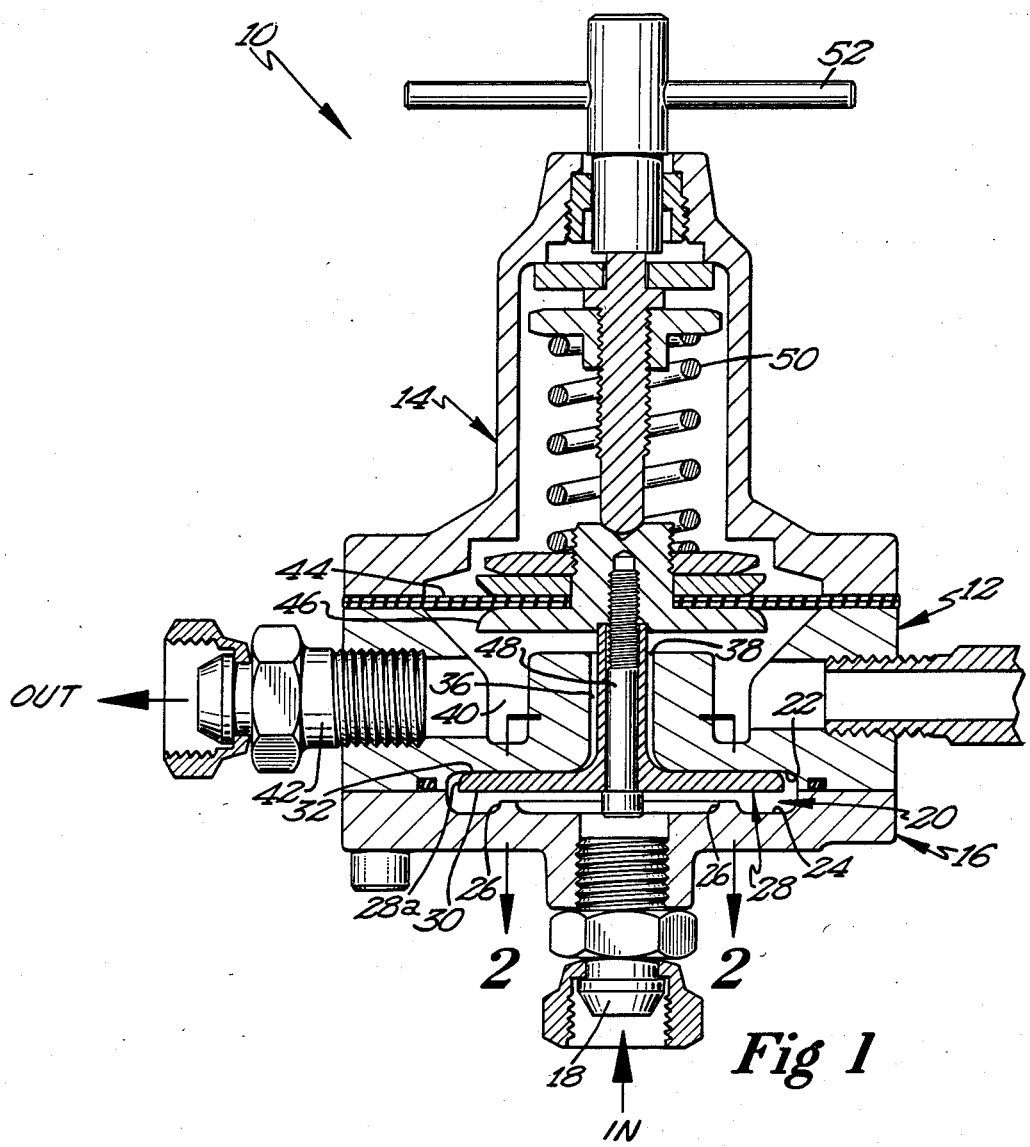
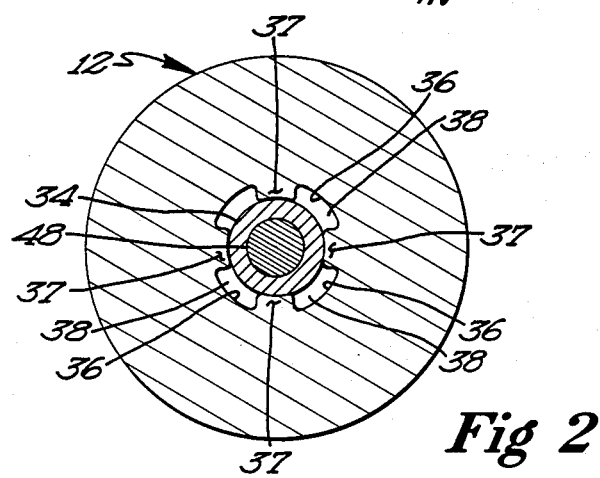

NON-DEGRADING PRESSURE REGULATOR

BACKGROUND OF THE INVENTION

Pressure regulators for controlling the pressure of fluids in various types of systems such as paint circulating systems are well known. Such circulating systems are particularly popular for circulating materials or fluids such as paints in a production setting. Such paints can often include metallic paints which are particularly subject to degradation caused by the regulators. It has been discovered that degradation increases drastically when the fluid flow passes into the turbulent flow regime.

Heretofore, prior art regulators have typically induced turbulent flow in the process of regulating the pressure. Laminar flow regulators have been generally known as shown in U.S. Pat. No. 4,003,405. Also, the use of laminar flow to provide a degradation reducing device is shown in co-pending U.S. patent application Ser. No. 136,982.

It is therefore an object of the instant invention to provide a regulator which may be easily and inexpensively manufactured and which will effectively regulate the pressure of a system while at the same time maintaining laminar flow generally throughout the device and minimize, if not eliminate, paint degradation.

SUMMARY OF THE INVENTION

A housing is provided having a central axis and having an inlet leading into a pressure reducing chamber along that axis. Located in the pressure reducing chamber is a pressure reducing member having a disk-like shape with a stem extending from its upper surface. The stem extends through a pressure reducing passage and forms annular gaps between the outer diameter of the stem and the inner diameter of the passage.

A controlled clearance is maintained between the upper surface of the disk and the top of the pressure reducing chamber such that as fluid flows between those two surfaces and through the annular gap, laminar flow is maintained and the desired degree of pressure reduction is achieved. A slight taper is maintained between the disk and the top of the pressure reducing chamber so as to allow ease of actuation of the device without inlet pressure holding the disk in a closed position.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 1 is a cross sectional view of a regulator according to the instant invention.

FIG. 2 is a sectional view taken along line 2—2 of FIG. 1.

DESCRIPTION OF THE PREFERRED EMBODIMENT

The regulator of the instant invention, generally designated 10, is provided with a main housing 12, an upper housing 14 and a lower cap 16. Lower cap 16 has an inlet passage 18 therein which leads to a pressure reducing chamber 20 having a top 22 and a bottom 24. The bottom 24 of pressure reducing chamber 20 has stops 26 which serve to prevent pressure reducing member 28 from contacting bottom 24.

Pressure reducing member 28 is generally disk-like in shape and has a lower surface 30 and an upper surface 32. Extending from upper surface 32 is a stem 34 which passes through annular pressure reducing passages 36 in main housing 12. Formed between stem 34 and pressure reducing passages 36 are annular gaps 38. The four protrusions 37 extend inwardly from housing 12 to guide stem 34. After passing through annular gaps 38, fluid passes to outlet chamber 40 and thence through outlet fitting 42.

A diaphragm 44 is fastened between upper housing 14 and main housing 12 and is activated by means of a diaphragm base 46. Pressure reducing member 28 and stem 34 are fastened to diaphragm base 46 by means of a bolt 48. Diaphragm 40 is biased in place by spring 50 which bears against diaphragm nut 54 and may be adjusted by rotating handle 52 which bears against the upper surface of diaphragm base 46.

By way of example, a particular regulator is designed so as to maintain laminar flow generally within the device. The unit is designed for use with paints having a viscosity of about 40–45 centipoise and is designed to provide an adjustable pressure drop of approximately 20–180 PSI with a maximum inlet pressure of 250 PSI in conjunction with flow rates of 0.1 to 1.5 gallons per minute.

In this example, the pressure reducing member disk 28 has an outside diameter of 2.188 inches with stem 34 having an outside diameter of 0.311 inches. The diameter of pressure reducing passage 36 is chosen to provide annular gaps of approximately 0.020 inches between passages 36 and stem 34. As can be seen in FIG. 1, a slight taper of about 1 degree (°) is provided relative to the upper surface of pressure member disk 28 such that the clearance between upper surface 32 and top 22 of chamber 20 is slightly greater adjacent the outer edge of disk 28 then adjacent stem 34. Providing this taper allows the fluid passing through inlet 18 to act generally in both the upper and lower surfaces of member 28 so as to allow that member to be opened easily by means of the handle and not have the pressure act to force member 28 shut.

The clearance between the top 22 of chamber 20 and the upper surface 32 of member 28 at outer edge 28a when closed is approximately 0.012 inches. When fully opened, that is, when lower surface 30 contacts stops 26 the clearance is approximately 0.074 inches. When closed, the two surfaces act as a shutoff valve. The main pressure reduction occurs in the area between the upper surface 32 of reducing member 28 and the top 22 of chamber 20. A secondary restriction to flow velocity occurs in the annular gaps formed between stem 34 and housing 12. This secondary restriction acts as a back pressure around the disk 28. The above dimensions yield a device which maintains laminar flow generally throughout its intended range of operation and which substantially reduces if not eliminates degradation of paint flow there through.

It is contemplated that various changes and modifications may be made to the fluid pressure regulator without departing from the spirit and scope of the invention as defined by the following claims. Of course while specific reference has been made to paint by way of example, other fluids or materials may be regulated equally effectively with the device of the instant invention.

What is claimed is:

1. A fluid pressure regulator comprising:
   a housing having at least one pressure reducing passage along a central axis;
   an outlet;
   a pressure reducing chamber having a top, a bottom, and a smooth rounded transition between said inside diameter and said top;
   disk-like pressure reducing member in said chamber having a thickness, a radius large relative to said thickness, an outer edge, a generally smooth lower surface, a generally smooth upper surface, a stem and a smooth rounded transition between said stem and said upper surface, said stem extending from said upper surface through each said passage, the annular clearance between the inside diameter of each said passage and the outside diameter of said stem and the axial clearance between said top and said upper surface and between said bottom and said lower surface being relatively small compared to said radius and such so as to maintain fluid flow therebetween in the laminar regime; and
   an inlet, said inlet being located in said chamber bottom adjacent said axis so as to define a flow path through said inlet, outwardly over said bottom surface, around said outer edge, over said top surface and through said axial pressure reducing passage, said flow path being generally unobstructed, the dimensions of said flow path being such so as to maintain flow in the laminar regime at all times.

2. The fluid pressure regulator of claim 1 wherein the distance between said upper surface and said top is less adjacent said stem than adjacent said outer edge.

3. The fluid pressure regulator of claim 1 further comprising means for controlling the distance between said upper surface and said top.

4. The fluid pressure regulator of claim 3 wherein said controlling means comprises a diaphragm.

5. The fluid pressure regulator of claim 1 further comprising means for spacing said lower surface from said bottom.

* * * * *